Oct. 30, 1945. E. S. PEARCE 2,387,807
JOURNAL BEARING
Original Filed June 2, 1942 3 Sheets-Sheet 1

INVENTOR
Edwin S. Pearce
BY
Synnestvedt & Lechner
ATTORNEYS

Oct. 30, 1945.　　　　E. S. PEARCE　　　　2,387,807
JOURNAL BEARING
Original Filed June 2, 1942　　3 Sheets-Sheet 2
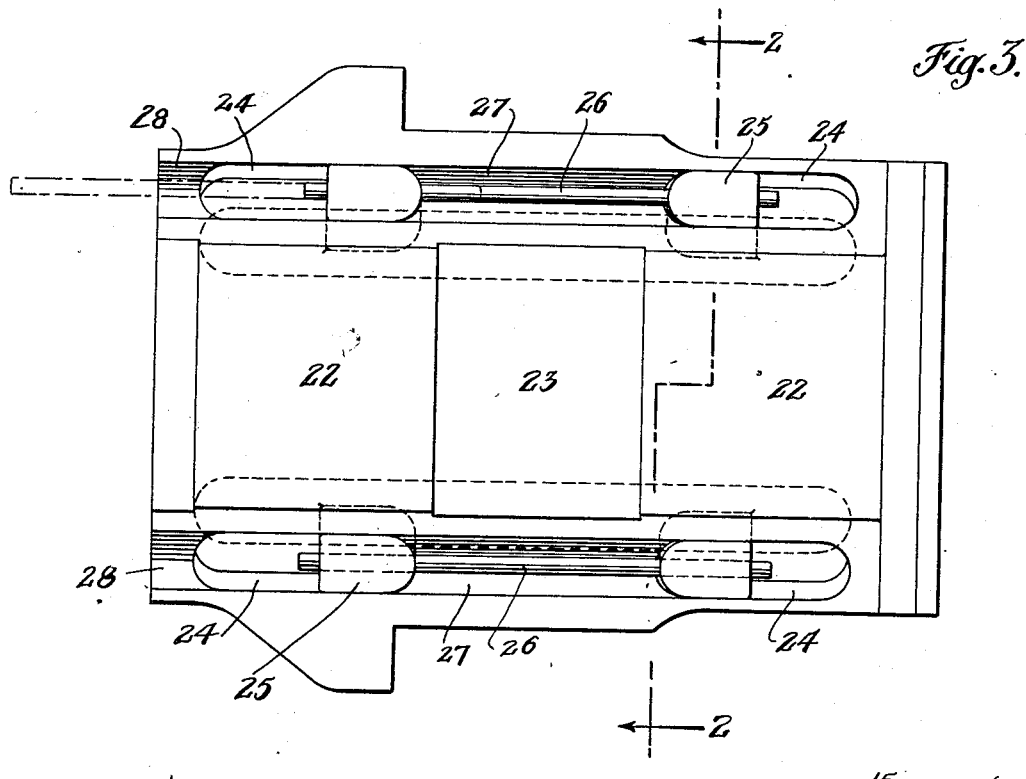
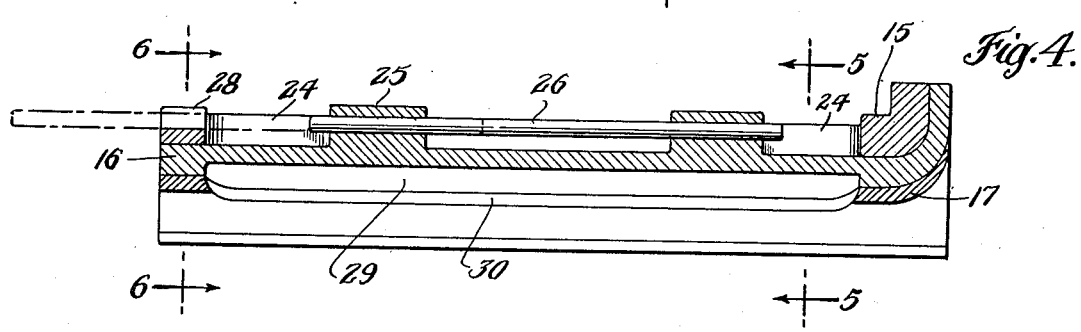
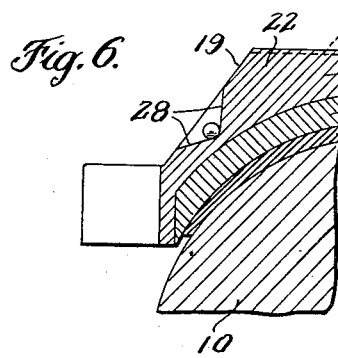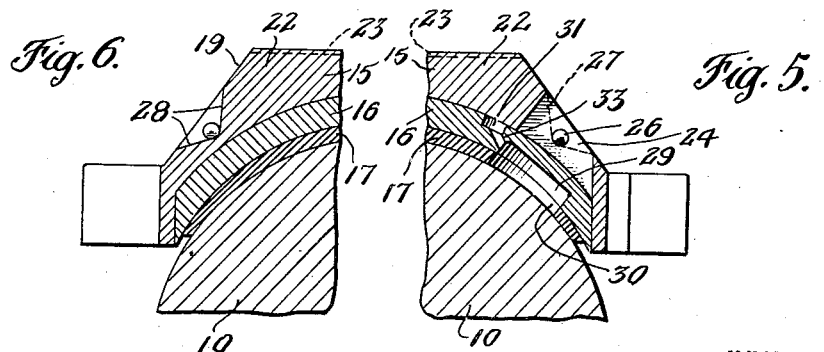
INVENTOR
Edwin S. Pearce
BY
Ernestvedt & Lechner
ATTORNEYS Oct. 30, 1945.  E. S. PEARCE  2,387,807

JOURNAL BEARING

Original Filed June 2, 1942  3 Sheets-Sheet 3

INVENTOR
Edwin S. Pearce
BY
Lynestvedt & Lechner
ATTORNEYS

Patented Oct. 30, 1945

2,387,807

UNITED STATES PATENT OFFICE 2,387,807

JOURNAL BEARING

Edwin S. Pearce, Indianapolis, Ind.

Original application June 2, 1942, Serial No. 445,418. Divided and this application March 31, 1944, Serial No. 528,883

2 Claims. (Cl. 308—54)

This invention relates to journal bearings and particularly to crown journal bearings for use in the axle boxes of railway vehicles and the present application is a division of my earlier copending application, Serial No. 445,418, filed June 2, 1942.

The objects of the invention include the following: To provide a structure by means of which it is possible to greatly reduce the quantities of strategic metals such as copper, lead, tin and antimony which have heretofore gone into the manufacture of bearings of the type in question; to improve the strength of the bearing and its ability to withstand the stress and wear of service as well as to increase its resistance to the destructive effects of heat; to provide a structure which combines the best characteristics of ferrous as well as of non-ferrous metals; to provide a bearing which has an increased margin of operating safety; to provide a bearing which may be relatively cheaply manufactured, easily replaced or renewed as well as one which is interchangeable with prevailing structures; to provide (in a bearing of the character described) a structural backing or strength member which is capable of functioning as an adapter for use with separable or readily renewable or replaceable bearing metal parts or inserts whereby any one of several types of operational characteristics can be employed as may best meet the demands of any particular service; to provide (in connection with the object last recited) a structure in which the bearing part or insert is kept in its proper place by means which lie outside the major load supporting area of the bearing whereby certain difficulties heretofore encountered in composite bearings are entirely overcome; to provide a structure having an adapter or backing member and a bearing metal insert as described in which the insert is not positively interlocked with the adapter or backing member so as to become, in effect, an integral part thereof as has been characteristic of composite bearings heretofore used in the art, but rather one wherein the bearing insert is held in place by means which permit ready separation of the two parts so that the insert can be detached and renewed at the point or place of application without the necessity of sending the bearing assembly to the shop; to provide a bearing having an adapter or backing member and a bearing metal insert, as described, wherein the insert is not subject to any distortion which might otherwise occur due to the difference in the coefficient of expansion between the material of the backing member and the material of the insert; to provide a bearing having a backing or adapter member into which an insert can be fitted so as to yield suitable passages for circulating the oil from one side of the journal to the other side and this by means of a simple casting without the necessity of extensive or expensive machine work; and, in general, to materially improve the operational characteristics of railway crown journal bearings, while at the same time lowering their cost, increasing their strength and simplifying their maintenance.

The invention is illustrated in preferred form in the accompanying drawings wherein—

Figure 3 is a plan view of my improved bearing;

Figure 4 is a section taken on the line 4—4 of Figure 2;

Figure 5 is a section on the line 5—5 of Figure 4;

Figure 6 is a section on the line 6—6 of Figure 4;

Figure 1:
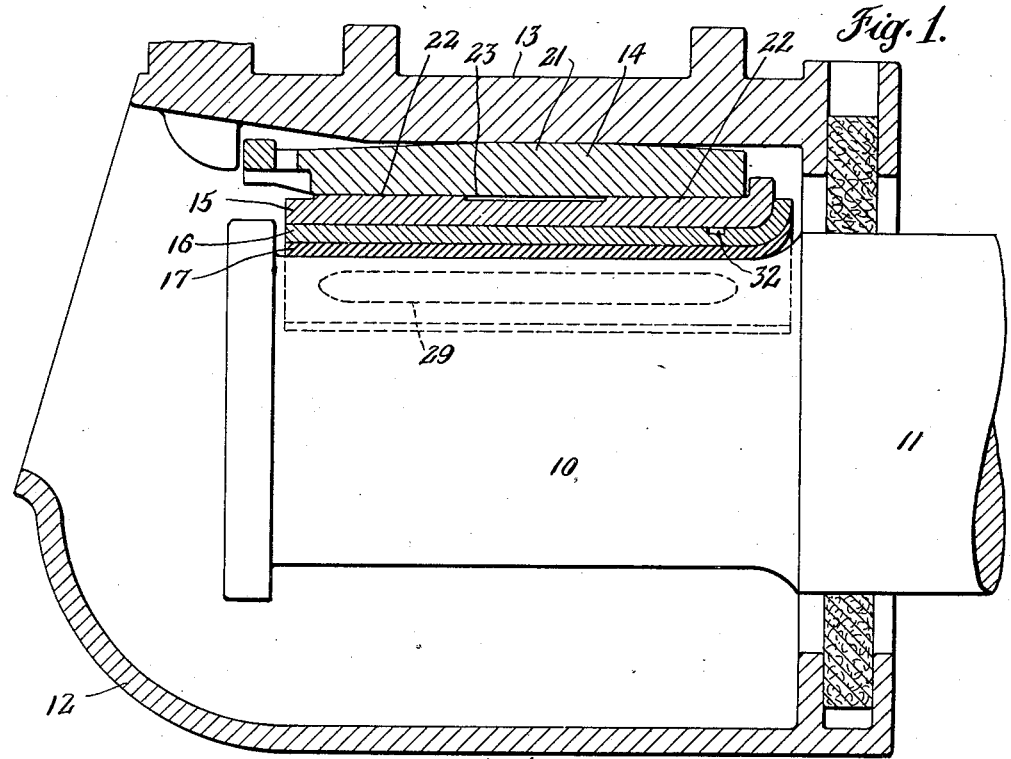
Figure 1 is a vertical longitudinal section through a journal box of a railway vehicle showing my improved bearing structure applied therein, the section being taken approximately as indicated by the line 1—1 in Figure 2.
Figure 2:
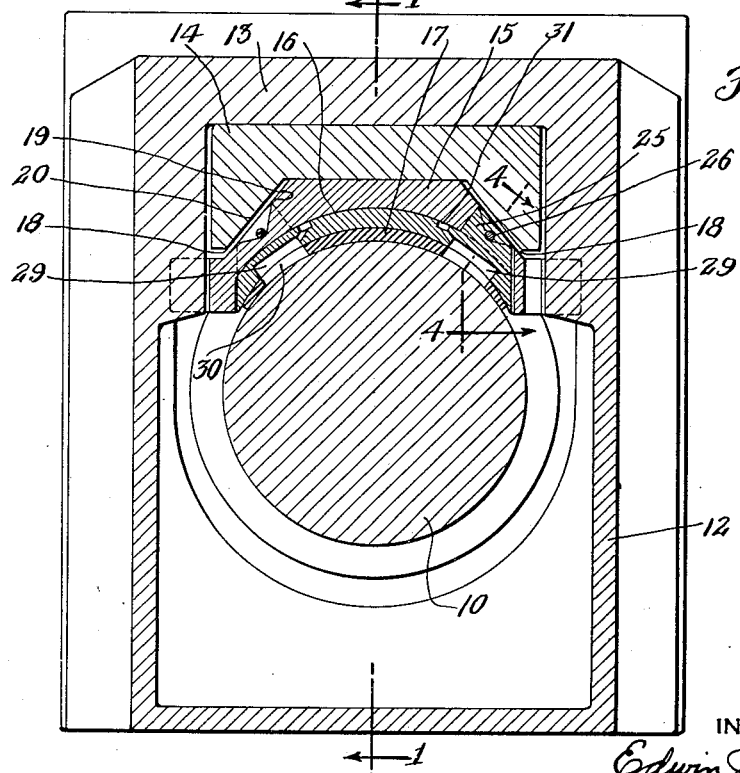
Figure 2 is a vertical transverse section through a journal box equipped with my invention, the section being taken approximately as indicated by the line 2—2 of Figure 3.
Figure 7:
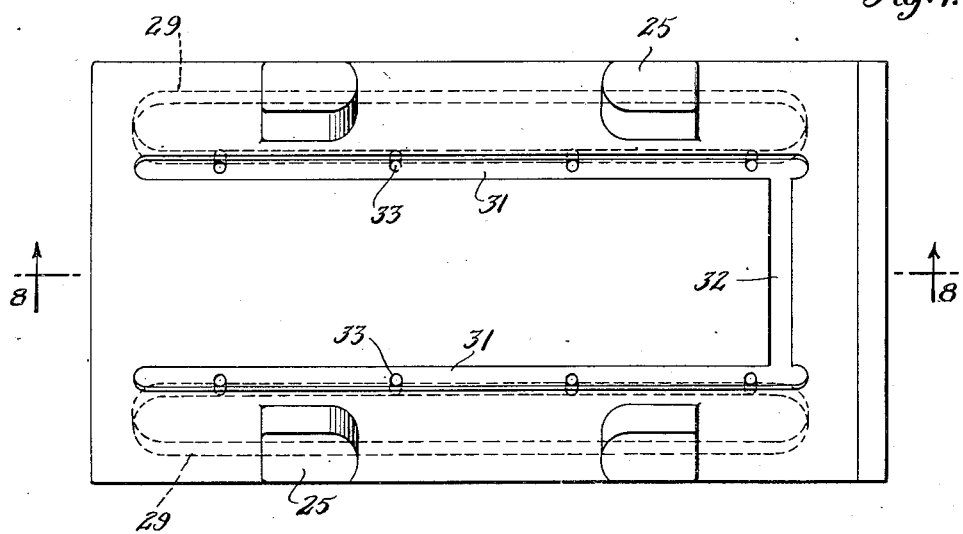
Figure 7 is a plan view of the bearing metal insert of my invention.
Figure 8:
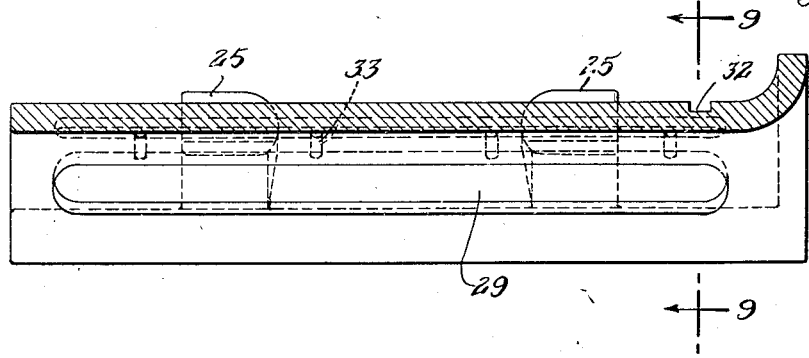
Figure 8 is a section on the line 8—8 of Figure 7.
Figure 9:
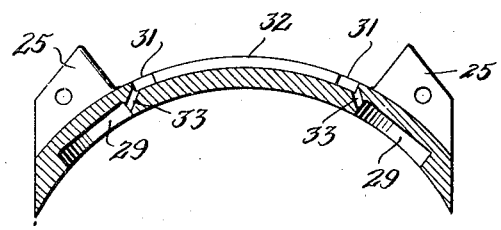
Figure 9 is a section on the line 9—9 of Figure 8.

In Figures 1 and 2 of the drawings the usual journal 10 on the end of the car axle 11 is shown as projecting into the car or journal box 12 in a manner well understood in this art. Immediately beneath the top of the box 13 is the customary so-called wedge member 14 between which and the journal 10 is located the improved crown journal bearing of the present invention.

The bearing comprises a structural backing or strength member 15, a separable bearing metal insert 16 and a Babbitt metal lining 17. The strength or backing member constitutes an adapter as will more fully appear hereinafter, and is preferably composed of steel or other metal or alloy having relatively great strength and high melting point. The general shape of this backing or adapter member and the configuration of its top surface or back is, preferably, substantially the same as that of the ordinary bearing familiar in this art, and it will be seen that it cooperates with the wedge 14 so as to provide a slight space 18 at each side between the inclined surface 19 of the bearing and the adjacent inclined surface 20 of the wedge.

The load is transmitted through the top of the box to the central high point 21 of the wedge and distributed by the latter to the longitudinally spaced end portions 22 on the back of the adapter, thus leaving a central relieved area 23 the nature and purpose of which are more fully described and claimed in my prior Patent 2,154,916, issued April 18, 1939. The inclined faces 19 of the adapter 15 are each provided with a pair of elongated longitudinally spaced openings 24 which are formed as apertures or holes extending all the way through from the journal side of the adapter out of the space 18.

The bearing insert 16 is preferably composed of some suitable relatively soft bearing metal, such as bronze, on each side of the back of which are provided complementary positioning lugs 25 arranged in pairs at each side so as to project into corresponding openings 24 in the adapter or backing member as shown to best advantage in Figure 3.

The openings 24 and the lugs 25 are arranged in pairs at each side of the crest of the bearing so that they are well removed from the region of highest bearing load and are not subject to the stresses which are ordinarily set up in and near the crest of the bearing.

The two parts just described, if desired, may be held together when assembled by means of a pair of dowel pins 26 which are introduced from one end of the bearing into suitable longitudinally extending apertures in the lugs 25, as shown to best advantage in Figures 3 and 4 in which figures the partially inserted dowels are shown in dot-and-dash lines in order to bring out this feature somewhat more clearly. When in assembled position the mid-portion of the dowels overlies the V-shaped portions 27 on the back or top surface of the sides of the adapter. During insertion the dowels pass over similar inclined or V-shaped surfaces 28 at the outer end of the bearing. This arrangement for holding the parts together is not essential to a realization of the advantages of the invention because, in service, my improved bearing functions as a unit without the dowels. However, the dowels serve to keep the backing member and the insert together as companionate parts when they are initially assembled and shipped.

The concave face of the bearing metal insert is provided at each side of its crest with an elongated slot 29 which extends throughout substantially the entire length of the bearing although the slots are closed at their ends. These slots are of substantial width, as shown. The insert is also provided with the customary Babbitt metal lining 17, as already mentioned, there being openings 30, of course, in this lining to register with the slots 29.

It should be noted that the slots 29, in cooperation with the openings 30, constitute elongated slots which are of substantial depth as well as width. This is important to the proper functioning of the slots throughout the life of the bearing. The oil coming up on the surface of the journal fills the slot on the inbound side so that it acts as a lubricant-reservoir. Indeed, it is important to have the slots 29 in the insert 16 of substantial depth regardless of the possible thickness of the lining 17, so that the slots as a whole can function satisfactorily even after the lining becomes very much worn in service so that its thickness is materially reduced. The importance of this is emphasized by the fact that it is desirable to keep the lining 17 as thin as possible not only to save lead and tin but also to promote heat conductivity. Lead is a relatively poor conductor of heat so that the conductivity of the bearing as a whole is improved by reducing the thickness of the lining 17 and, therefore, the amount of lead through which the heat must travel. By making the slot 29 in the bearing metal insert 16 of considerable depth as shown and described, it is possible to preserve the functions of the slot throughout the life of the bearing while at the same time effecting a substantial saving in strategic metals.

At this point I should also like to call attention to the fact that by aligning the lugs 25 with the slots 29 there is very little if any surface under the lugs which contacts the surface of the journal 10. Even those portions of the bearing which lie to the outside of the slots 29, under all normal running conditions, do not actually contact with the surface of the journal due to the so-called "wedge space" which exists at each side of a crown bearing of this type. This serves to reduce to a minimum the amount of heat which is developed and transferred through the metal to the parts which cooperate in holding the adapter and the bearing metal insert in proper relationship during service.

It will be seen that my improvements make it possible to substantially reduce the amount of bearing metal or bearing metal alloy which has heretofore been employed in the manufacture of crown journal bearings. As a general rule in previous practice the entire bearing has been made of a solid piece of brass with a lining of Babbitt metal. With my invention the backing or adapter member 15 can be made of steel which is not only less expensive but also far stronger than brass and much less subject to damage from over-heating and mechanical stresses. In addition, while the insert 16 is preferably made of brass, the quantity of brass required is kept at a minimum by virtue of the slots 29. Again, there is still further saving in strategic and expensive metals or alloys since the Babbitt lining 17 does not extend throughout the entire journal face of the bearing but is provided with the openings 30 in registry with the openings 29 so that the weight of Babbitt which would ordinarily go into the formation of a lining over the areas in question is rendered unnecessary in my improved construction.

In addition to the foregoing, my improved construction makes possible another important saving. In the conventional bearings known to the art which are generally of one piece, antimony is included as a hardener or an agent to increase the mechanical strength of the copper-lead-tin alloy customarily employed in the manufacture of bearings. With my invention the proper degree of strength is supplied by the ferrous metal adapter 15. It will be seen, therefore, that the bearings of the prior art actually represent a compromise between bearing qualities on the one hand and strength characteristics on the other hand, whereas, with my improved construction, the bearing metal insert 16 can be fabricated upon 100% bearing requirements and the adapter upon 100% mechanical or strength requirements. In this way I am enabled to greatly improve the operational characteristics of the bearing as well as to lengthen its useful life.

In addition to the advantage incident to the saving of metal it will also be realized that my improvements make it possible to provide a bearing construction of greatly increased strength while at the same time in no way sacrificing the advantages which are to be found in the employment of the so-called bearing metals. The strength and resistance to mechanical stresses and the damaging effects of heat are realized through the fact that the adapter can be made of steel, and the advantages incident to the use of the so-called bearing metals through the fact that the bearing insert can be made of such materials. For example, in the event that a hot box should develop and the Babbitt lining 17 melt out, the bearing metal of the insert 16 would come into contact with the journal 10 instead of the steel of the adapter 15, so that damage to the journal would be avoided.

With my improvements the adapter really becomes a part of the journal box assembly in the same sense as is the usual wedge 14, and the adapter with its bearing insert can be readily substituted for the customary bearing without involving any change whatsoever in present practice. Furthermore, where replacements become necessary, all that is required is to have on hand a stock of bearing inserts which can be easily applied to my improved adapter, as described.

In order to circulate the oil from one side to the other of the bearing as in the manner described in my prior Patent 1,964,688, issued June 26, 1934, the present invention makes it possible to incorporate the advantageous features of that patent by the simple expedient of combining with the backing member the separable insert described, on the back of which are formed a pair of longitudinally extending channels or grooves 31, one at each side of the crest. These grooves are interconnected by a circumferentially extending transverse channel or groove 32 preferably located near one end of the bearing. A series of small apertures or openings 33 are also provided which openings connect the upper corner portion of each slot 29 with the adjacent longitudinal channel 31 on the back of the insert. In the embodiment shown, four holes 33 are illustrated for each side of the bearing. When the insert is placed in the adapter the upper open faces of the channels 31 and 32 are effectively closed so that the oil which enters the slot 29 on the upbound side of the rotating journal can pass through the holes 33 into the corresponding longitudinal channel 31 from which it traverses the cross channel 32 into the other longitudinal channel 31 and then downwardly through the holes 33 into the slot 29 on the outbound side of the journal.

As described in my Patent 1,964,688, the vacuum created on the outbound side plus the tendency to build up a pressure on the inbound side causes the oil to circulate from the inbound side to the outbound side and be discharged on the latter side. This circulation helps to cool the bearing and insures an adequate supply of oil which is stored in the channels 31 and 32 when the journal begins rotation after a period of idleness. Furthermore, such circulation helps to keep both sides of the waste in the journal box equally well saturated with oil so that, after long periods of running in one direction, there is not, as would otherwise happen, a tendency to accumulate the oil in that portion of the waste which is located on the inbound side while leaving the outbound side somewhat dry. My invention, therefore, makes it possible to employ cross-circulation of the type just described in an exceedingly simple way and since the inserts are readily made as castings, no troublesome or expensive machining is necessary as has heretofore been necessary with the invention of my Patent 1,964,688.

In conclusion, I wish to point out that my improved construction involves no permanent union between the inserts and the adapter such, for example, as might be provided by pressing, keying, riveting, or otherwise permanently securing the one part to the other with the idea of making the insert, in effect, an integral part of the backing or adapter. Composite bearings of this nature have heretofore been attempted with the idea of approaching as nearly as possible a construction which involves such a close union between the insert and the backing as to make them, in effect, one inseparable member which must be treated in exactly the same way as the standard bearings customary in the art. My improvement involves a readily detachable or separable bearing metal insert which is held in position by means located beyond the region of high bearing loads so as to be substantially unaffected by the stresses set up in and near the crest of crown journal bearings. This avoids distortion and other difficulties incident to the difference in coefficient of expansion between the backing member and the insert.

I claim:

1. A crown journal bearing having a structural adapter or strength member and a separable bearing metal insert, said insert having a longitudinal slot in its journal face at each side of the crest, an aperture extending from each slot to the back of the insert, and groove or channel means on the back of the insert interconnecting said apertures, the open upper face of said channel means being completely covered by said adapter whereby to provide a closed circulating passage connecting said slots.

2. In a railway axle journal box having a wedge with a central load-transmitting area of substantial width flanked by a downwardly facing and outwardly inclined portion at each side; a bearing adapted to cooperate with the wedge in transmitting the load to the journal, said bearing comprising a structural adapter or strength member having a load-receiving crest portion of a width corresponding to the width of the central load-transmitting area of the wedge, a downwardly and outwardly extending inclined portion at each side of said crest, which inclined portions are arranged in slightly spaced relation to the adjacent inclined faces of the wedge, an opening in each of said side portions of said adapter member opposite the adjacent inclined face of the wedge, a separable insert member of relatively soft bearing metal, a cooperating positioning lug on the back of each side portion of the insert in position to project into the opening in the adjacent side portion of the adapter, a longitudinal slot in the journal face of the insert at each side of the crest which slot is arranged in alignment with the lug and the opening into which it projects, a corresponding groove on the back of each side of the insert toward the inside of the lug, an aperture extending from each of said slots through the insert to the corresponding groove at the back, and an additional groove on the back of the insert interconnecting said side grooves, the open upper faces of all of said grooves being covered by said adapter whereby said apertures and said grooves provide closed circulating passage means interconnecting the slots on the journal face of the insert.

EDWIN S. PEARCE.